UNITED STATES PATENT OFFICE.

EDWARD G. SOLTMANN, OF NEW YORK, N. Y.

COMPOSITION FOR MANIFOLD COPYING-PADS.

SPECIFICATION forming part of Letters Patent No. 534,805, dated February 26, 1895.

Application filed March 1, 1894. Serial No. 501,993. (No specimens.)

*To all whom it may concern:*

Be it known that I, EDWARD G. SOLTMANN, a citizen of the United States of America, and a resident of New York, in the county and State of New York, have invented a new and useful Improvement in Compositions for Manifold Copying-Pads, of which the following is a specification.

My invention has reference to improvements in slabs or pads for producing manifold copies of writing, drawings and analogous matter; and especially to those slabs or pads usually composed of clays mixed with water and other matter to make a plastic mass which hardens on exposure to the atmosphere.

In the manufacture of slabs or pads of this character it has heretofore been invariably the custom to use water as a material ingredient,—but such slabs or pads, after a short period of time, lose their elasticity and adhesiveness, and either crack or become too hard for use. By careful research I have determined that this rapid deterioration is entirely due to the evaporation of the water contained in the composition. The object of my present invention is therefore to provide a slab or pad which is practically anhydrous, and consequently free from the objectionable features above set forth.

According to my invention, I make the slab or pad of a composition of china-clay (kaolin), glycerine, dextrine and cornstarch, in the following proportions, to wit:—dry china-clay, seventy-two parts; glycerine (commercially pure), thirty parts; dry commercial dextrine, one-half part; dry cornstarch, ten parts. These ingredients are mixed and kneaded in the usual manner to form a thick dough which by molding or rolling and cutting is made into slabs or pads of the required size and shape.

The process for making manifold copies with these slabs or pads is the same as that now in ordinary use.

The dextrine may be omitted and the quantity of cornstarch increased accordingly. Ordinary laundry starch may be used as a substitute for the cornstarch.

By varying the proportion of glycerine from that above given, a softer or harder slab or pad can be produced.

The pad or slab may, in like manner, be made of dry china-clay and commercially pure glycerine only, mixed in about the proportions before set forth; since the cornstarch and dextrine serve only as binding materials.

What I claim is—

1. The herein described anhydrous composition of matter to be used for manifolding slabs or pads, consisting of china-clay, glycerine, and starch, in substantially the proportions set forth.

2. The herein described anhydrous composition of matter to be used for manifolding slabs or pads, consisting of china-clay, glycerine, dextrine and starch, in substantially the proportions set forth.

3. The herein described anhydrous composition of matter to be used for manifolding slabs or pads, consisting of china-clay and glycerine, in substantially the proportions set forth.

In testimony that I claim the foregoing as my invention I have signed my name, in presence of two witnesses, this 24th day of February, 1894.

EDWARD G. SOLTMANN.

Witnesses:
    A. FABER DU FAUR, Jr.,
    KLAS H. TERNSTEDT.